(12) United States Patent
Grendelmeier et al.

(10) Patent No.: US 11,974,691 B2
(45) Date of Patent: May 7, 2024

(54) APPARATUS WITH LINEAR DRIVE FOR PREPARING FOODSTUFFS

(71) Applicant: Carogusto AG, Amriswil (CH)

(72) Inventors: Thomas Grendelmeier, Hombrechtikon (CH); Philipp Schenk, Schönenberg an der Thur (CH); Samuel Schranz, Worben (CH)

(73) Assignee: Carogusto AG, Amriswil (CH)

( * ) Notice: Subject to any disclaimer, the term of this patent is extended or adjusted under 35 U.S.C. 154(b) by 993 days.

(21) Appl. No.: 16/766,897

(22) PCT Filed: Nov. 30, 2017

(86) PCT No.: PCT/EP2017/080984
§ 371 (c)(1),
(2) Date: May 26, 2020

(87) PCT Pub. No.: WO2019/105555
PCT Pub. Date: Jun. 6, 2019

(65) Prior Publication Data
US 2020/0297141 A1 Sep. 24, 2020

(51) Int. Cl.
*A47J 27/04* (2006.01)
*A23L 5/10* (2016.01)
(Continued)

(52) U.S. Cl.
CPC .............. *A47J 27/04* (2013.01); *A47J 27/16* (2013.01); *F16D 7/10* (2013.01); *A23L 5/13* (2016.08); *A47J 2027/043* (2013.01); *A47J 36/00* (2013.01)

(58) Field of Classification Search
CPC ........................ F16D 43/2028; F16D 43/204
See application file for complete search history.

(56) References Cited

U.S. PATENT DOCUMENTS 3,967,711 A * 7/1976 Stroezel .............. F16D 43/2024
74/567
5,601,491 A * 2/1997 Chan ...................... F16D 7/048
192/79
(Continued)

FOREIGN PATENT DOCUMENTS

CN 102852998 A 1/2013
CN 203906699 U 10/2014
(Continued)

OTHER PUBLICATIONS

Translation of CN-203906699-U (Year: 2014).*
(Continued)

*Primary Examiner* — Elizabeth M Kerr
(74) *Attorney, Agent, or Firm* — Bachman & LaPointe, P.C.

(57) ABSTRACT

The invention relates to an apparatus (1) for preparing foodstuffs accommodated in a vessel (2), the apparatus including a steam-generating unit arranged in a housing (3) and intended for generating steam, a steam-feeding unit (4) connected to the steam-generating unit in a steam-conducting manner via a steam-supply line and having a steam probe (6) containing at least one steam-discharging opening, and a linear drive having a drive train (17) with an electric motor (18) and by means of which a carriage (10), which carries the steam-feeding unit (4) or a vessel holder (7), is adjusted in translatory fashion relative to the housing (3), wherein an overload clutch (28) is integrated in the drive train (17), between the electric motor (18) and a belt drive (13), in the form of a toothed belt drive, for adjusting the carriage (10).

18 Claims, 5 Drawing Sheets

(51) Int. Cl.
*A47J 27/16* (2006.01)
*A47J 36/00* (2006.01)
*F16D 7/10* (2006.01)

(56) References Cited

U.S. PATENT DOCUMENTS

| | | | |
|---|---|---|---|
| 2006/0124331 A1* | 6/2006 | Stirm | F16D 43/208 |
| | | | 173/178 |
| 2011/0306269 A1* | 12/2011 | Horikoshi | A63H 1/12 |
| | | | 446/261 |
| 2018/0008083 A1* | 1/2018 | Han | A47J 27/12 |

FOREIGN PATENT DOCUMENTS

| | | | |
|---|---|---|---|
| CN | 203906699 U | * | 10/2014 |
| CN | 107331056 A | * | 11/2017 |
| CN | 206608514 U | | 11/2017 |
| DE | 102015221004 A1 | * 4/2017 | ............. A47J 27/04 |
| JP | 57-73230 A | 5/1982 | |
| JP | 04-019942 U | 2/1992 | |
| JP | 06-174038 A | 6/1994 | |
| JP | 2003070644 A | 3/2003 | |
| JP | 2015-102105 A | 6/2015 | |
| KR | 101421000 B1 | 7/2014 | |
| SU | 262339 A1 | 1/1970 | |
| WO | 2016200156 A1 | 12/2016 | |
| WO | 2017072180 A1 | 5/2017 | |

OTHER PUBLICATIONS

Translation of DE-102015221004-A1 (Year: 2017).*
Translation of CN-107331056-A (Year: 2017).*
International search report for patent application No. PCT/EP2017/080984 dated Jul. 5, 2018.
International preliminary report of patentability for patent application No. PCT/EP2017/080984 dated Oct. 25, 2019.

* cited by examiner

APPARATUS WITH LINEAR DRIVE FOR PREPARING FOODSTUFFS

BACKGROUND OF THE INVENTION

The invention relates to an apparatus for preparing foodstuffs, in particular ready meals, accommodated in a vessel, the apparatus comprising a steam-generating unit which is disposed in a housing and is intended for generating steam, the apparatus also comprising a steam-feeding unit which is connected to the steam-generating unit in a steam-conducting manner via a steam supply line and which has a steam probe which has at least one steam discharge opening, the apparatus also comprising linear drive means which has a drive train which has an electric motor and by means of which a carriage, which carries in particular the steam-feeding unit or a vessel support, is displaced in a translational manner relative to the housing.

From WO 2016/200156, an apparatus for preparing foods is known. Said apparatus comprises a housing and a unit for generating steam for applying steam to the food accommodated in a vessel. Additionally, a drive train is known which is driven by an electric motor and which is used in order to displace a carriage in a translational manner relative to the housing. The carriage can be displaced with the steam-generating unit.

WO 2017/072180 A1 also discloses an apparatus for preparing foods by using steam.

WO 2017/072180 A1 describes a device for preparing foodstuffs accommodated in a vessel, wherein a steam-feeding unit can be displaced along a vertical guide rail relative to a vessel by means of a lift drive, the vessel being supported at a vessel support. The vessel support can be displaced from a loading position in which the vessel support can be loaded with the vessel and a functional position (steam application position) below the steam-feeding unit by means of a horizontal displacement drive. The object is to realize more secure drive means which have a simpler construction.

SUMMARY OF THE INVENTION

Concerning the apparatus, said object is attained by the features disclosed herein, i.e., concerning a generic apparatus, by the fact that an overload clutch, preferably realized as a ratcheting clutch, is integrated in the drive train between the electric motor and a belt drive, preferably realized as a toothed belt drive, for displacing the carriage in order to limit a maximum transmittable drive torque.

Advantageous embodiments of the invention are disclosed in the dependent claims. All combinations of at least two features disclosed in the description, the claims and/or the figures constitute part of the scope of the invention.

The idea of the invention is to displace the carriage, which carries a functional unit of the apparatus, in a translational manner relative to the housing via a belt drive, preferably realized as a toothed belt drive, which is driven between its adjusting positions by means of an electric motor. Compared to a spindle drive, a belt drive provided according to the invention is formed in a simple manner and allows in particular for fast back and forth movements of the carriage along an, in particular horizontal or vertical, displacement axis. Furthermore, a simple integration of an overload clutch (safety clutch) for reducing the risk of injury can be realized by providing a belt drive in the drive train for the carriage. As is set out below, the overload clutch is preferably realized as a ratcheting clutch. The overload clutch ensures that the maximum torque to be transmitted in the drive train is limited, for example directly by the user, and the risk of injury for the user is minimized when the movement path of the carriage is blocked. With respect to the specific functionality or disposition of the drive train according to the invention in the apparatus, different possibilities are available. According to a first, preferred embodiment, the drive train can be disposed in such a manner that a steam-feeding unit can be displaced relative to a vessel and/or relative to a vessel support, in particular in the vertical direction, by means of said drive train. To this end, the carriage preferably carries the steam-feeding unit. According to an additional possible embodiment, which can be realized as an alternative or in addition to the aforementioned embodiment in a common apparatus, the carriage carries a vessel support which can be displaced by means of the drive train which comprises the belt drive and the overload clutch, in particular in the horizontal direction, in a translational manner between a loading position and a functional position below the steam-feeding unit. It is also possible to displace the vessel support by means of the drive train according to the invention in the vertical direction relative to the preferably stationary steam-feeding unit. In a particularly preferred embodiment of the apparatus for preparing foodstuffs accommodated in a vessel, said apparatus has two drive trains realized according to the idea of the invention, each drive train comprising a belt drive, in particular a toothed belt drive, and an overload clutch, in particular for the purpose of displacing the steam-feeding unit, preferably in a vertical, translational, manner and for the purpose of displacing a vessel support, in particular in a horizontal, translational manner between a loading and discharging position and a steam application position below the steam-feeding unit. The at least one drive train including the electric motor, the ratcheting clutch and the belt drive is preferably located inside the housing, an assigned, elongated housing opening being either permeated by the carriage itself or by the functional unit disposed on the carriage, in particular the steam-feeding unit or the vessel support, up to the outer side of the apparatus.

The overload clutch comprises at least one rotatable, preferably monolithic, plastic spring element, particularly preferably in the form of a plastic injection-molded part, which deflects in the case of an overload, for transmitting a torque between a drive side and an output side of the overload clutch. The plastic spring element is realized and disposed in such a manner that, if a defined maximum torque is exceeded, the plastic spring element deflects and the torque transmission from the drive side to the output side is interrupted or limited by twisting of the drive side and the output side of the clutch relative to one another in the deflected state.

By providing a plastic spring element, preferably no metal spring elements are required, a particularly cost-efficient overload clutch which is less susceptible to corrosion thus being realizable. By providing a plastic spring element, the spring element can be scaled in a particularly simple manner with respect to a maximum torque to be transmitted. For this purpose, the material thickness of the plastic spring element has to be adapted in the axial direction in relation to an axis of rotation of the plastic spring element and/or the number of axially adjacent plastic spring elements has to be adapted.

It is particularly useful if the plastic spring element has a centric polygonal output opening (on the output side) for transmitting a torque to an output shaft, a belt drive wheel, in particular a gear, for driving the belt drive preferably sitting on the output shaft. The belt drive wheel is preferably disposed in a non-rotatable manner on the output shaft.

With respect to the specific realization of the plastic spring element, it has proved particularly advantageous if the plastic spring element has two diametrically opposite, preferably arc-shaped spring sections, particularly preferably in the form of a D, which are made of plastic. According to a first embodiment, said spring sections can be realized so as to be symmetrical to a (mirror) plane which accommodates the axis of rotation of the plastic spring element, the same maximum torques thus being transmittable in both displacement direction of the belt drive when interacting with a lock gearing which is independent of a specific direction. In an alternative embodiment, the two diametrically opposite spring sections are realized so as to be asymmetrical to the aforementioned plane and therefore support the realization of two different maximum torques to be transmitted which depend on a specific direction.

In principle, the plastic spring element can directly interact with a lock gearing, in particular a clutch disk or clutch sleeve in order to transmit a torque and to engage in the case of an overload. In a preferred embodiment, the at least one plastic spring element carries at least one rolling element, in particular a roller, which is made of a different plastic than the plastic spring element and which preferably has a higher thickness, particularly preferably a metallic material, in order to transmit a torque to a lock gearing, and that, in the case of an overload, the at least one rolling element unrolls on the lock gearing by deflecting of the at least one plastic spring element or ratchets so as to be audible by means of a rattling sound. A spring force is preferably applied to the rolling element by means of the plastic spring element, preferably against the lock gearing in the radial direction. If the rolling element is realized as a roller, said roller is preferably disposed so as to be rotatable on an axis which extends in parallel to an, in particular centric, axis of rotation, the plastic spring element being rotatable about said axis of rotation in order to transmit a torque from the drive side to the output side of the clutch.

Several rolling elements are preferably distributed on the circumference. The clutch particularly preferably comprises, in particular exclusively two, diametrically opposite rolling elements, each rolling element being preferably realized as a rotatable roller.

With respect to the configuration of the lock gearing, two different possibilities are available. Said lock gearing can be realized so as to be independent of a specific direction, i.e. in such a manner that the gearing has tooth profiles which are symmetrical in both circumferential directions or directions of rotation and that the same torque is required for engaging in both directions of rotation. Such an embodiment is particularly advantageous if the drive train is used for the horizontal displacement of a vessel assembly. According to an alternative embodiment, a lock gearing which depends on a specific direction, i.e. a lock gearing which has an asymmetrical tooth profile, is used, a different torque being required for engaging in the different directions of rotation, preferably in combination with asymmetrical spring sections of the plastic spring element. Such an embodiment is particularly advantageous if the drive train is used for the vertical displacement of the steam-feeding unit, the lock gearing being preferably realized in such a manner that a lower torque is required for engaging, i.e. releasing the safety clutch when the steam-feeding unit is vertically displaced in a downward direction towards the vessel and a higher release torque is required for a displacement in the opposite direction.

Irrespective of the specific configuration of the lock gearing, said lock gearing can be alternatively disposed on the drive side or the output side of the clutch. Preferably, the lock gearing is disposed on the drive side, wherein said lock gearing can be realized, for example, in a monolithic manner with a drive wheel, which is in particular realized as a worm wheel and which is in particular made of plastic and which can be preferably driven via a worm drive by means of the electric motor. In an alternative embodiment, the lock gearing can be realized at a clutch plate, in particular as an inner gearing, said clutch plate being made of metal, for example, and being connected in a non-rotatable manner to a drive wheel, in particular a worm wheel.

In principle, the at least one rolling element, in particular the at least one roller, can be supported by a single plastic spring element. In a preferred embodiment, the rolling element is supported or carried by two plastic spring elements which are axially adjacent, in particular spaced apart from one another, the rolling element, in particular the roller, preferably sitting on an axis which extends between the axially opposite plastic spring elements.

It is conceivable that the rolling element sits in a non-rotatable manner on the axis and that the axis is realized as a shaft and is disposed so as to be twistable relative to the plastic spring elements. In a preferred embodiment, the rolling element can unroll on the axis which is preferably kept in two insertion openings of axially adjacent plastic spring elements. The apparatus preferably comprises a belt tensioning device for tensioning the belt, in particular the toothed belt. It is generally conceivable to dispose either a belt drive roller or an opposite pulley in a displaceable manner. In a preferred embodiment, the belt tensioning device is disposed at the carriage, in such a manner that two belt sections can be displaced towards one another via a displacement mechanism of the belt tensioning device in order to tension the belts. In principle, it is conceivable to realize the belt as an endless belt, but said realization is not required with respect to the present application, because the carriage cannot be driven in a circumferential manner, but only in a back and forth movement. For this reason, a preferred embodiment can be realized in which the belts have two free ends which can be displaced towards one another by means of the belt tensioning device.

It is particularly useful if a translational guidance of the carriage, in particular comprising two parallel sliding rods, is assigned to the carriage. In an embodiment of the invention, said guidance of the carriage can also be used for supporting the components of the drive train in order to create a drive train module which can be integrated in a particularly simple manner in the housing of the apparatus when it is assembled. Said drive train module preferably comprises the guide rods which support the belt drive wheel, the electric motor and the overload clutch on one end and a belt pulley on the other end. The belt pulley and the belt drive are preferably disposed in a permanently stationary manner and the belt tensioning is preferably realized via a belt tensioning device on the side of the carriage.

BRIEF DESCRIPTION OF THE DRAWINGS

Further advantages, features and details of the invention can be derived from the following description of preferred exemplary embodiments and from the drawing.

In the following.

In the figures, the same elements and elements having the same function are referenced with the same reference numerals.

DETAILED DESCRIPTION

Figure 1:
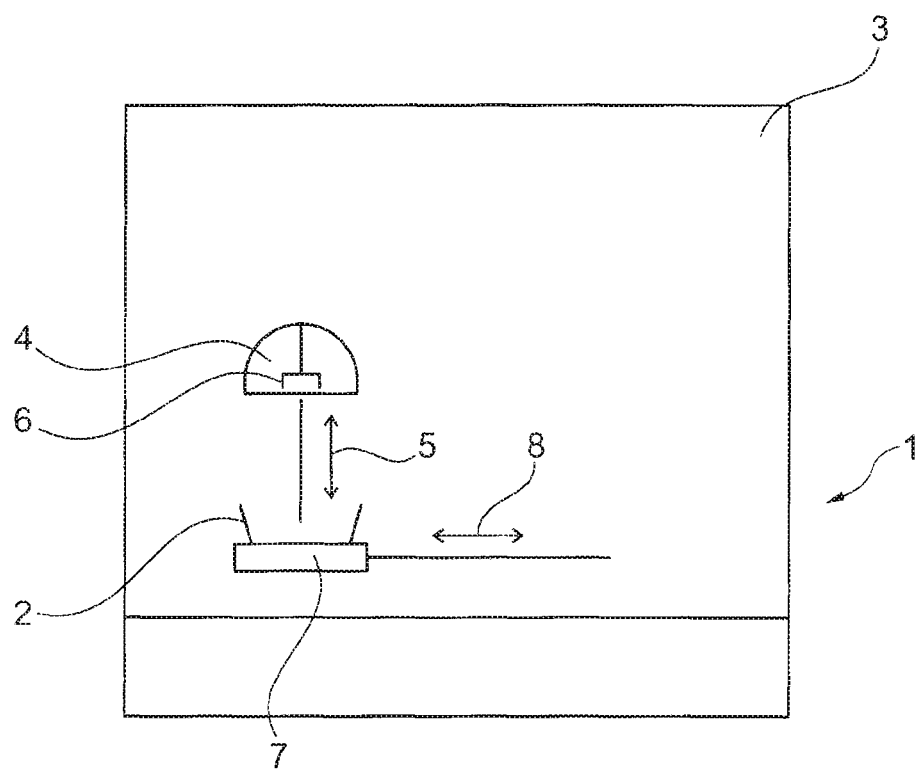
FIG. 1 is a schematized front view of an apparatus realized according to the idea of the invention for preparing foodstuffs accommodated in a vessel, a steam-feeding unit being displaceable in the vertical direction by means of drive means realized according to the idea of the invention and a vessel support being displaceable back and forth in the horizontal direction by means of drive means realized according to the idea of the invention.

In FIG. 1, an apparatus 1 is shown in a schematized manner for preparing, in particular heating, foodstuffs, in particular ready meals, arranged in a vessel 2 using steam. Apparatus 1 comprises a housing 3 in which a steam-generating unit having a downstream steam superheating unit, if applicable, is located in order to generate, in particular superheated, steam and to supply it to a steam-feeding unit 4 via a steam supply line inside the housing. Steam-feeding unit 4 can be displaced in a translational manner in arrow directions 5 along the vertical, in fact from the shown upper position into a lower position in which steam-feeding unit 4 sits on vessel 2 and realizes a cooking chamber 4. Steam-feeding unit 4 comprises steam probes 6 having steam outlet openings for heating the foodstuff. Steam probes 6 can preferably be rotated, in particular about a vertical axis, in order to ensure an improved steam distribution.

In the shown exemplary embodiment, vessel 2 which is not part of apparatus 1 sits on a vessel support 7 which can be displaced back and forth in a translational manner in the vertical along arrow directions 8, in fact between the shown functional position below steam-feeding unit 6 and a loading position which is offset to the right in the drawing layer and in which a vessel support can be placed on vessel support 7 and can be removed after the heating.

Figure 2:
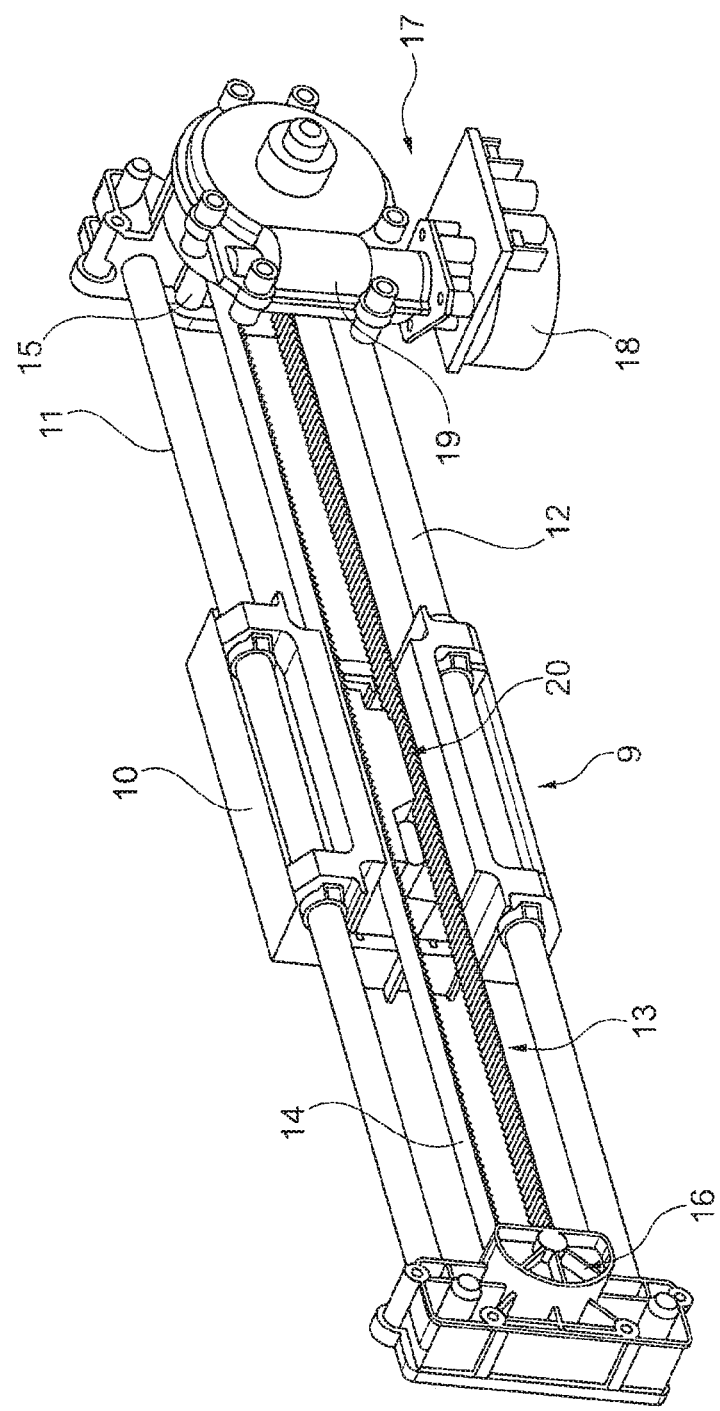
FIG. 2 is a perspective view of drive means according to the idea of the invention which are realized as a module and which comprise a belt drive which is realized as a toothed belt drive.

FIG. 2 shows a preferred embodiment of drive means 9 for displacing steam-feeding unit 4 and/or vessel support 7 according to FIG. 1 in a translational manner. Drive means 9 are realized in such a manner that they displace a carriage 10 back and forth in a translational manner, carriage 10 carrying the actual functional unit, i.e. steam-feeding unit 4 or, alternatively, vessel support 7 in the present case. Drive means 9, together with the carriage, are located inside housing 3 according to FIG. 1, oblong or slot-like housing openings being permeated by the respective functional unit.

In the shown exemplary embodiment, drive means 9 are realized as a drive module and comprise parallel guide rods 11, 12 which carry carriage 10 and along which carriage 10 can side during its translational displacement movement. Furthermore, drive means 9 comprise a belt drive 13 which is realized as a toothed belt drive and which has a belt 14 which is realized as a toothed belt and which can be driven by a belt drive wheel 15 and which is deflected around a belt pulley 16 on the opposite side.

Drive means 9 or drive train 17 comprise an electric motor 18 which drives a drive wheel 29 which is realized as a worm wheel and which is disposed in a gear housing 19 via a worm drive which is disposed in gear housing 19. An overload clutch (safety clutch or slip clutch) which is realized as a ratcheting clutch and which will be explained below is disposed between drive wheel 29 and belt drive wheel 15 in order to limit a maximum torque to be transmitted to carriage 10 and to the corresponding functional unit.

FIG. 2 shows that belt pulley 16 and belt drive wheel 15 are fixedly positioned relative to another by means of the connected overload clutch and electric motor 18. For tensioning belt 14, a belt tensioning device 20 is provided at carriage 10.

Figure 3:
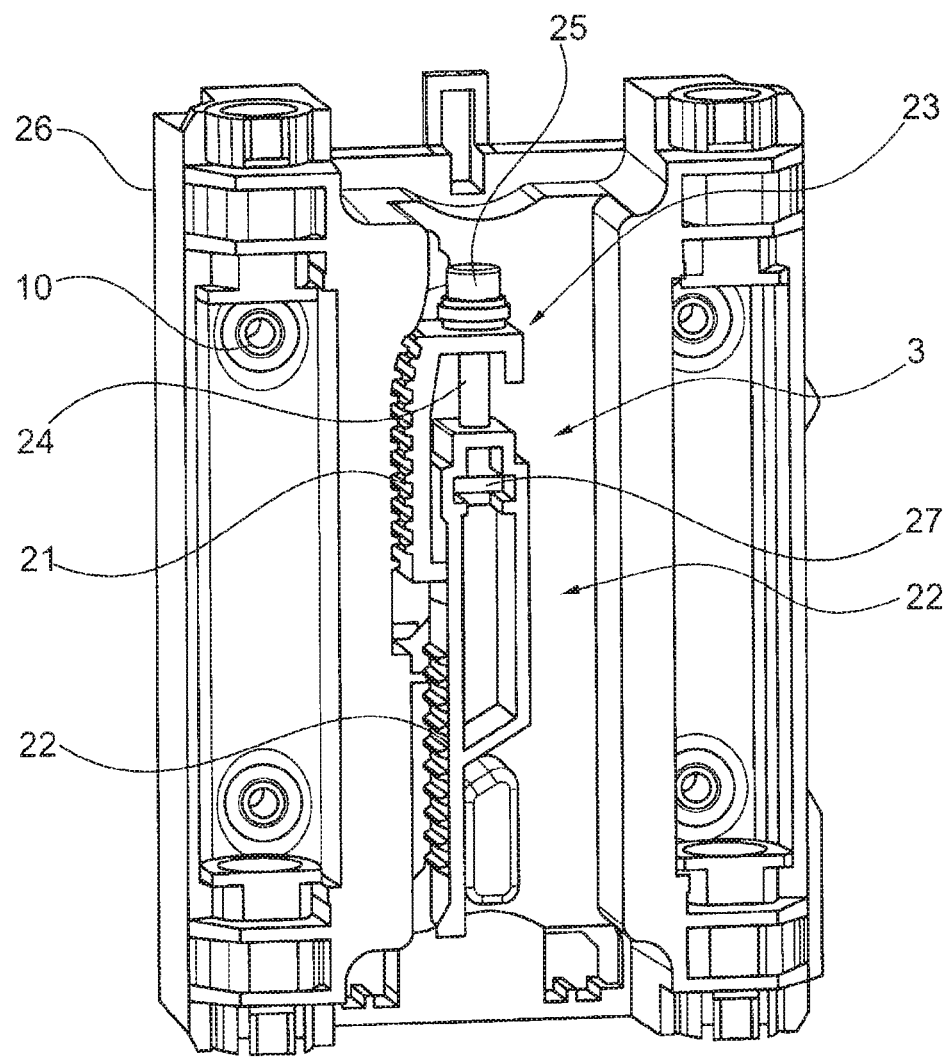
FIG. 3 is a rear view of a carriage of the apparatus; depending on the realization, said carriage carries a steam-feeding unit or a vessel support.

Belt tensioning device 20 is shown in greater detail in FIG. 3. Said belt tensioning device 20 comprises two belt fixing units 21, 22 which are disposed adjacent along the longitudinal extension of the belt and which can be disposed relative to one another, in particular towards one another, by means of a tensioning mechanism 23 in order to tension the belt. A free belt end is preferably kept in each fixing unit 21, 22. The tensioning device comprises a turnbuckle 24 having a drive 25 on the end side, turnbuckle 24 being displaceable against the spring force of a tension spring 26 and being twisted in a polygonal nut 27 which is realized as a square nut in the present case and which is kept in a non-rotatable manner in belt fixing unit 22.

Figure 4:
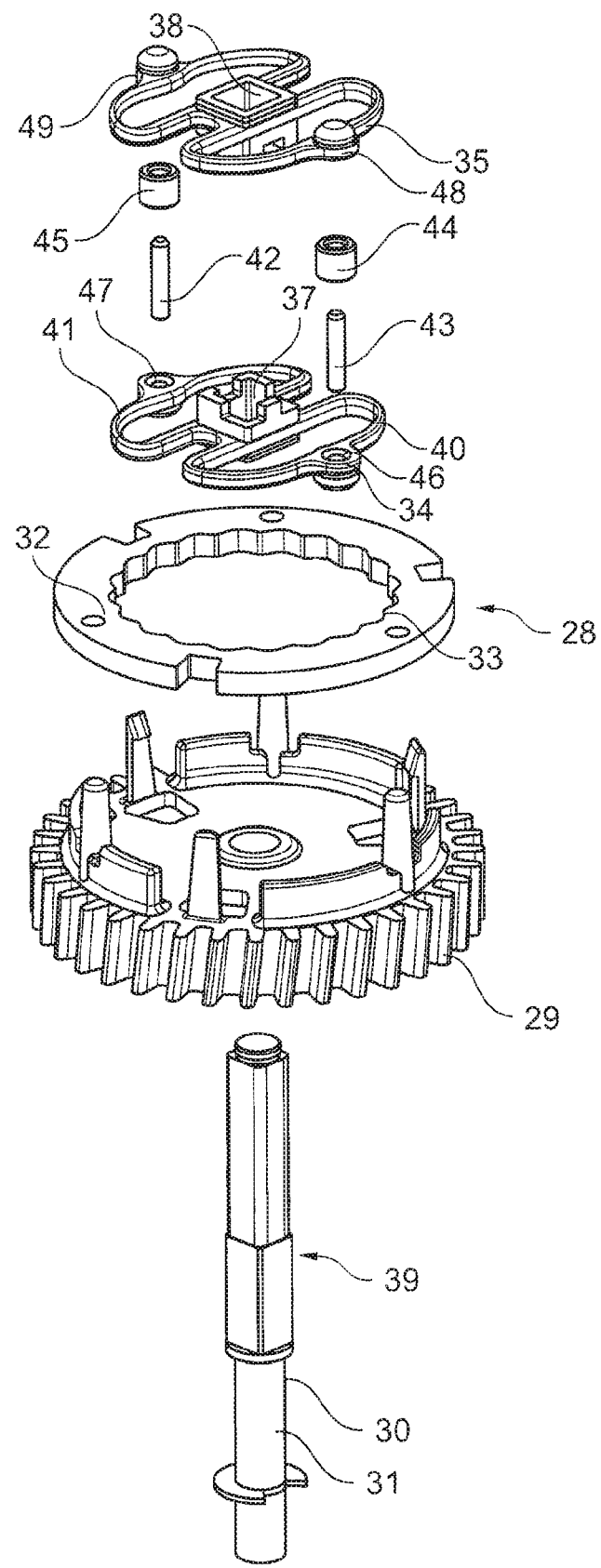
FIG. 4 is an exploded view of a first exemplary embodiment of a drive train comprising an overload clutch which is realized as a ratcheting clutch and which has a clutch plate which is fixed to a drive wheel which is realized as a worm wheel.

FIG. 4 shows an exploded view of a first, preferred exemplary embodiment of aforementioned overload clutch 28 realized as a ratcheting clutch as a part of the drive train of drive means 9. Aforementioned drive wheel 29 realized as a worm wheel is located inside the drive train, said drive wheel 29 being realized as a plastic injection-molded part in the present case and combing with a worm drive (not shown) which can be driven by means of the electric motor. In the assembled state, drive wheel 29 sits on a cylinder section 30 of an output shaft 31, belt drive wheel 15 mentioned in the context of FIG. 2 sitting in a non-rotatable manner on output shaft 31. Output shaft 31 can be freely twisted relative to drive wheel 29 (in the case of a ratcheting overload clutch).

Overload clutch 28 comprises a fixed clutch plate 32 which is made of metal in the present case and which is realized in a non-rotatable manner with drive wheel 29 made of plastic in the shown exemplary embodiment, said clutch plate 32 carrying a lock gearing 33 on the inner circumference, wherein lock gearing 33 can have teeth which have an asymmetrical or symmetrical tooth profile depending on the application (cf. general description).

In the shown exemplary embodiment, two monolithic plastic spring elements 34, 35 which are realized as plastic injection-molded parts are assigned to lock gearing 33, plastic spring elements 34, 35 each having a centric polygonal opening 37, 38 which interacts with a corresponding polygonal section 39 of output shaft 31 in order to transmit a torque for driving the belt drive and the carriage to output shaft 31.

In the shown exemplary embodiment, axially adjacent, one-piece (monolithic) plastic spring elements 34, 35 are realized in an identical manner, said embodiment being preferred-alternative or different geometries being realizable. Plastic spring elements 34, 35 each comprise two diametrically opposite, arc-shaped or D-shaped spring sections 40, 41 which can deflect to the radial inside in the case of an overload to the radial inside in relation to an axis of rotation of plastic spring elements 34, 35.

In the assembled state, two axes 42, 43 which bridge the axial distance between plastic spring elements 34, 35 are kept between plastic spring elements 34, 35 by plastic spring elements 34, 35, a rolling element 44, 45 realized as a roller sitting in a rotatable manner on axes 42, 43, a spring force being applied to rolling element 44, 45 towards the outside into lock gearing 33 in the radial direction by means of plastic spring element 34, 35 or spring sections 40, 41. As shown in FIG. 4, axes 42, 43 are kept in corresponding insertion openings 46, 47, 48, 49 of plastic spring elements 34, 35, insertion openings 46 to 49 being disposed in a bulge in an area on the radial outside of spring sections 40, 41. If a maximum torque is not exceeded, rolling elements 44, 45 engage in lock gearing 33, a torque thus being transmitted from the drive side, i.e. lock gearing 33 on the output side in the present case, to the output side, in the present case to polygonal openings 37, 38 or output shaft 31 which is connected in a non-rotatable manner. If a permitted, defined torque is exceeded, rolling elements 44, 45 unroll in the circumferential direction on lock gearing 33, i.e. preferably ratchet so as to be audible, the drive side and the output side of the clutch thus twisting relative to one another.

Figure 5:
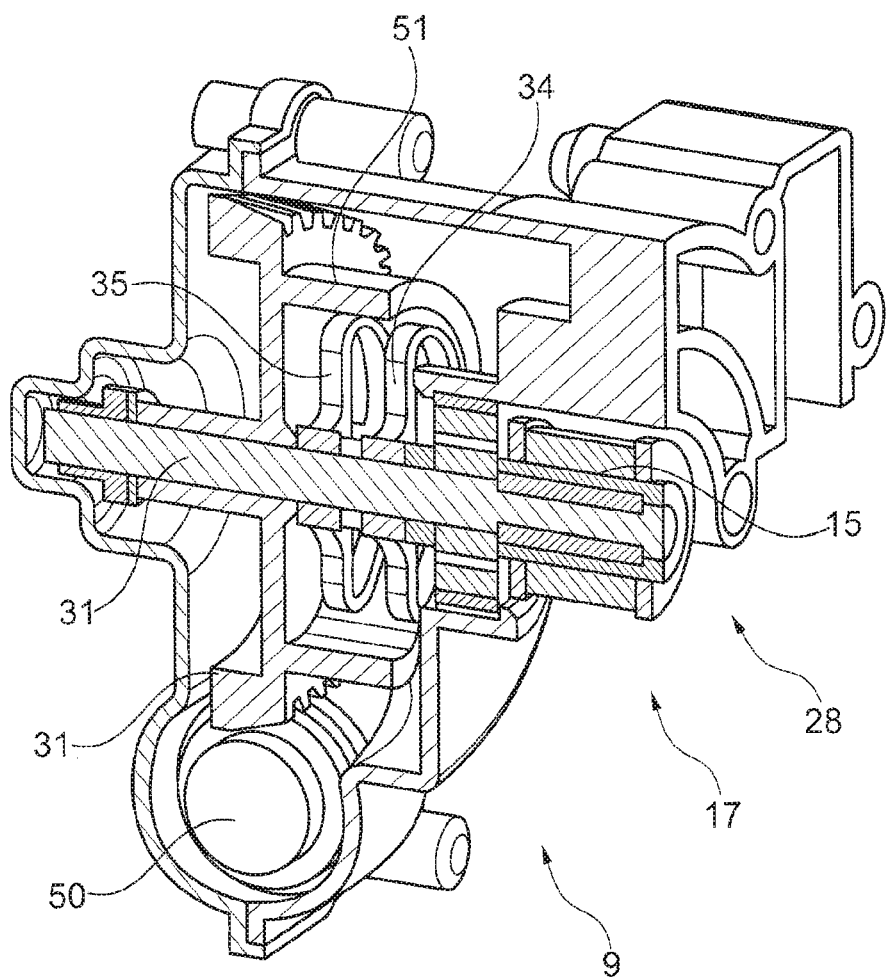
FIG. 5 is an alternative embodiment of the drive train, a lock gearing of the overload clutch realized as a ratcheting clutch being realized in a monolithic manner with the drive wheel realized as a worm wheel.

In FIG. 5, an alternative embodiment of drive train 17 of drive means 9 is shown. Worm drive 50 can be seen which can be rotated by means of the electric motor (not shown) in order to rotate drive wheel 29. In contrast to the aforementioned exemplary embodiment, the clutch plate is realized as a lock gearing section 51 of drive wheel 29 of overload clutch 28 in the shown exemplary embodiment—in other words, the lock gearing is realized in a monolithic manner with drive wheel 29. Furthermore, FIG. 5 shows output shaft 31 and belt drive wheel 15 which sits in a non-rotatable manner on output shaft 31 on the end side. With respect to the additional or different realization, it is referred to FIG. 4 and the corresponding description of the figure, in particular with respect to the functioning and disposition of plastic spring elements 34, 35 and the rolling elements which are kept by plastic spring elements 34, 35.

REFERENCE SIGNS 1 apparatus
2 vessel
3 housing
4 steam-feeding unit
5 arrow directions
6 steam probes
7 vessel support
8 arrow directions
9 drive means
10 carriage
11 guide rod
12 guide rod
13 belt drive
14 belt
15 belt drive wheel
16 belt pulley
17 drive train
18 electric motor
19 gear housing
20 belt tensioning device
21 belt fixing unit
22 belt fixing unit
23 tensioning mechanism
24 turnbuckle
25 drive of the turnbuckle
26 tension spring
27 polygonal nut
28 overload clutch
29 drive wheel
30 cylinder section of the output shaft
31 output shaft
32 clutch plate
33 lock gearing
34 plastic spring element
35 plastic spring element
36 polygonal opening of the plastic spring element
37 polygonal opening of the plastic spring element
38 polygonal section
39 spring section
40 spring section
41 axis
42 axis
43 rolling element
44 rolling element
45 insertion openings
46 insertion openings
47 insertion openings
48 insertion openings
49 worm drive
50 lock gearing section

The invention claimed is:

1. An apparatus (1) for preparing foodstuffs accommodated in a vessel (2), the apparatus comprising a steam-generating unit which is disposed in a housing (3) and is intended for generating steam, the apparatus also comprising a steam-feeding-unit (4) which is connected to the steam-generating unit in a steam-conducting manner via a steam supply line and which has a steam probe (6) which has at least one steam discharge opening, the apparatus also comprising linear drive means which have a drive train (17) which has an electric motor (18) and by means of which a carriage (10), which carries the steam-feeding unit (4) or a vessel support (7) is displaced in a translational manner relative to the housing (3), a belt drive (13) being used for displacing the carriage, wherein
an overload clutch (28) is integrated in the drive train (17) between the electric motor (18) and the belt drive (13) for the purpose of displacing the carriage (10), the overload clutch (28) comprising at least one rotatable, plastic spring element (34, 35), which deflects in the case of an overload, for transmitting a torque between a drive side and an output side,
wherein the at least one plastic spring element (34, 35) carries at least one rolling element (44, 45) which is made of a different plastic than the plastic spring element (34, 35) in order to transmit a torque to a lock gearing (33), and wherein, in the case of an overload, the at least one rolling element (44, 45) is disposed so as to unroll by springing of the at least one plastic spring element (34, 35) on the lock gearing (33).

2. The apparatus according to claim 1, wherein the plastic spring element (34, 35) is monolithic.

3. The apparatus according to claim 1, wherein the plastic spring element (34, 35) has a centric polygonal output opening (37, 38) for transmitting a torque to an output shaft (31).

4. The apparatus according to claim 3, wherein the output shaft (31) drives a belt drive wheel (15).

5. The apparatus according to claim 1, wherein
the plastic spring element (34, 35) has two diametrically opposite spring sections (40, 41) which are made of plastic and which are disposed symmetrically or asymmetrically to a plane which accommodates an axis of rotation of the plastic spring element (34, 35) and which spring in the radial direction in relation to the axis of rotation.

6. The apparatus according to claim 1, wherein
the lock gearing (33) is disposed on the drive side of the overload clutch (28).

7. The apparatus according to claim 6, wherein the lock gearing (33) is disposed in a non-rotatable manner in relation to or in a monolithic manner with a drive wheel (29).

8. The apparatus according to claim 7, wherein the drive wheel (29) is realized as a worm wheel.

9. The apparatus according to claim 1, wherein
the at least one rolling element (44, 45) is disposed between two plastic spring elements (34, 35) and is disposed on an axis which is supported by the plastic spring elements (34, 35).

10. The apparatus according to claim 1, wherein
a belt tensioning device (20) is disposed at the carriage, two belt sections being displaceable towards one another by means of said belt tensioning device (20) in order to tension the belt.

11. The apparatus according to claim 10, wherein the two belt sections are two belt ends.

12. The apparatus according to claim 1, wherein the foodstuffs are ready meals.

13. The apparatus according to claim 1, wherein the belt drive (13) is a toothed belt drive.

14. The apparatus according to claim 1, wherein the overload clutch (28) is a ratcheting clutch.

15. The apparatus according to claim 1, wherein the rolling element (44, 45) is a roller.

16. The apparatus according to claim 15, wherein the roller has a higher thickness than the plastic spring element (34, 35).

17. The apparatus according to claim 1, further comprising a translational guidance of the carriage comprising two parallel sliding rods.

18. The apparatus according to claim 17, wherein the translational guidance of the carriage supports the electric motor (18), the overload clutch (28) and a belt drive wheel (15) on one end and a belt pulley (16) on the other end.

* * * * *